(12) United States Patent
Foley et al.

(10) Patent No.: US 10,762,996 B2
(45) Date of Patent: Sep. 1, 2020

(54) APPARATUS FOR USE IN THE INSPECTION OF A TOP GRID GUIDE OF BOILING WATER REACTOR

(71) Applicant: WESTINGHOUSE ELECTRIC COMPANY LLC, Cranberry Township, PA (US)

(72) Inventors: Kevin J. Foley, Chattanooga, TN (US); Charles R. Barrett, Ooltewah, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 347 days.

(21) Appl. No.: 15/799,111

(22) Filed: Oct. 31, 2017

(65) Prior Publication Data

US 2019/0131022 A1    May 2, 2019

(51) Int. Cl.
| | |
|---|---|
| *G21C 17/013* | (2006.01) |
| *G21C 17/10* | (2006.01) |
| *G21C 17/00* | (2006.01) |
| *G21C 17/003* | (2006.01) |
| *G21C 19/20* | (2006.01) |

(52) U.S. Cl.
CPC .......... *G21C 17/013* (2013.01); *G21C 17/00* (2013.01); *G21C 17/003* (2013.01); *G21C 17/102* (2013.01); *G21C 19/207* (2013.01)

(58) Field of Classification Search
CPC .... G21C 17/003; G21C 17/013; G21C 17/10; G21C 17/102; G21C 19/20; G21C 19/207
See application file for complete search history.

(56) References Cited

U.S. PATENT DOCUMENTS

| | | | | |
|---|---|---|---|---|
| 4,826,650 A | * | 5/1989 | Richardson .......... | G21C 17/003 376/249 |
| 5,692,024 A | * | 11/1997 | McClelland ......... | G21C 17/013 376/245 |
| 2011/0235767 A1 | * | 9/2011 | Werner ................ | G21C 17/003 376/249 |
| 2012/0148010 A1 | * | 6/2012 | Carbonell ............ | G21C 17/017 376/249 |

* cited by examiner

*Primary Examiner* — Sharon M Davis
(74) *Attorney, Agent, or Firm* — K&L Gates LLP

(57) ABSTRACT

An apparatus for performing an inspection on the beams of the top guide of a BWR includes a housing, an alignment assembly, and an inspection system. The housing is receivable atop the upper edges of a first pair of beams adjacent a receptacle of the top guide. The reception of the housing atop the upper edges of the first pair of beams is facilitated by the alignment assembly which includes a plurality of legs that are simultaneously moved between a retracted position wherein one or more of the legs is disengaged from the beams within the receptacle and an extended position wherein all of the legs are engaged with the beams of the top guide within the receptacle. The inspection system includes a pair of inspection elements that are translated above a second pair of beams that are adjacent the receptacle and that do not have the housing received thereon.

11 Claims, 10 Drawing Sheets

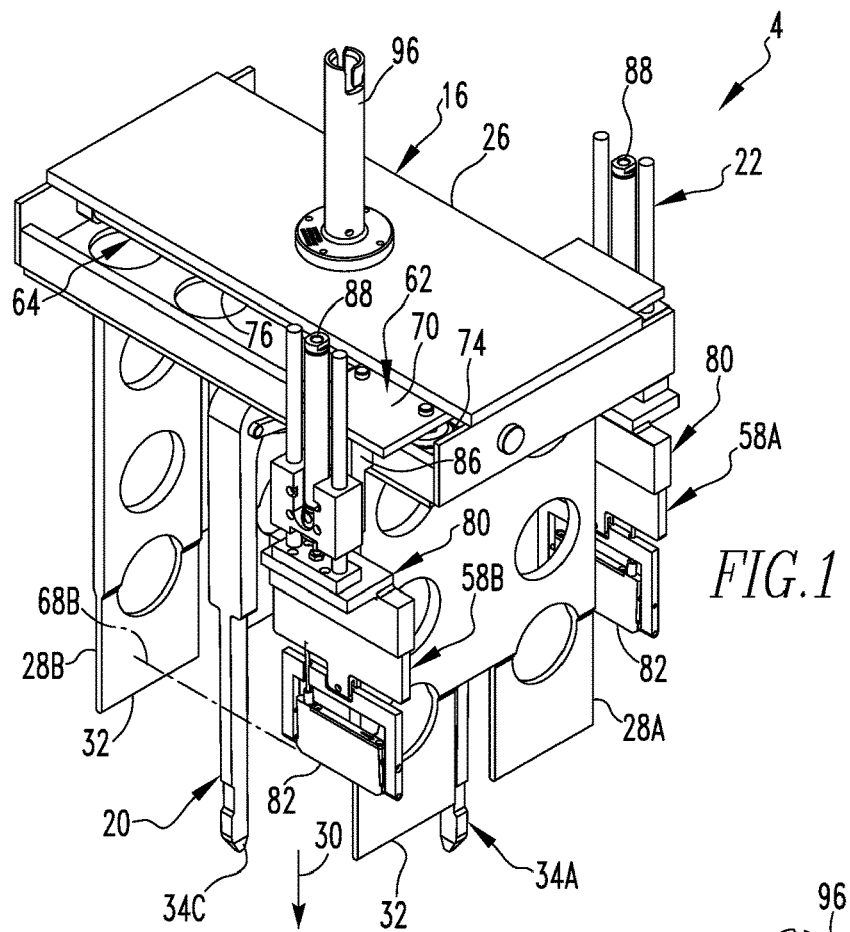

APPARATUS FOR USE IN THE INSPECTION OF A TOP GRID GUIDE OF BOILING WATER REACTOR

BACKGROUND

1. Field

The disclosed and claimed concept relates generally to testing equipment and, more particularly, to an apparatus for the inspection of the top guide of a boiling water reactor.

2. Related Art

Numerous types of nuclear reactors are known to exist in the relevant art. One type of nuclear reactor is a Boiling Water Reactor (BWR) that boils water to form steam to generate electrical power. Such BWRs and other reactors must be periodically inspected in order to ensure that they maintain structural integrity, and such inspections typically are performed during refueling operations on the reactor.

In a BWR, the fissile material typically is configured in fuel bundles that are supported in the BWR on a core plate at the lower end thereof and are supported at the top end thereof by a top guide. The top guide typically includes a plurality of beams that are arranged in a grid pattern to form a plurality of receptacles that are defined by and are situated adjacent corresponding segments of the grids, and typically four fuel bundles are received in each such receptacle.

In the past, when the top guide 8 has been the subject of an inspection operation such as an ultrasonic testing operation or other such operation, most if not all of the fuel bundles typically had been required to be removed from the receptacles. In removing such fuel bundles from a receptacle, the typical practice has been to remove a pair of fuel bundles from diagonally opposed positions within the receptacle and to then position in their place in the receptacle a dummy pair of space holders that are of an elongated rectangular shape and that are approximately of the same size and shape as the pair of removed fuel bundles. Such reception of the dummy pair into the empty spaces vacated by the removed fuel bundles avoids the two remaining fuel bundles in receptacle from falling out of position. The space holders typically are connected together with a bail to enable the removal of the dummy pair after the two remaining fuel bundles are removed from the receptacle.

Further regarding past inspection methodologies, once the fuel bundles and dummy pairs have been removed from the receptacles, the previous inspection methodology for the top guide have involved receiving a large inspection machine down onto the top guide that would occupy a large portion if not the entirety of the top guide. Such inspection devices were costly, difficult to maneuver, and interrupted other operations that might have been performed on the BWR. Improvements thus would be desirable.

SUMMARY

Accordingly, an improved apparatus for use in performing an inspection on the beams of the top guide of a BWR includes a housing, an alignment assembly, and an inspection system. The housing is receivable atop the upper edges of a first pair of beams adjacent a receptacle of the top guide. The reception of the housing atop the upper edges of the first pair of beams is facilitated by the alignment assembly which includes a plurality of legs that are simultaneously moved between a retracted position wherein one or more of the legs is disengaged from the beams within the receptacle and an extended position wherein all of the legs are engaged with the beams of the top guide within the receptacle. The inspection system includes a pair of inspection elements that are translated above a second pair of beams that are adjacent the receptacle and that do not have the housing received on the upper edges thereof. After the inspection of the second pair of the beams adjacent the receptacle, the alignment assembly can be moved to the retracted position. The apparatus can then be rotated ninety degrees and the alignment assembly can be returned to the extended position, which permits the housing to be received on the second pair of beams, i.e., whose segments adjacent the receptacle have just been inspected. The inspection system can then be operated to inspect the upper edges of the first pair of beams that are adjacent the receptacle. The apparatus is usable to perform such an inspection without any need to remove the fuel bundles or the dummy pair from a receptacle, although the apparatus is still usable to inspect the beam segments adjacent a receptacle even if the fuel has been removed from the receptacle. The apparatus requires very little space above the top guide, thus permitting operations to be performed on other parts of the BWR while the apparatus is inspecting various segments of the beams of a given receptacle.

Accordingly, an aspect of the disclosed and claimed concept is to provide an apparatus that can perform an inspection operation, such as an ultrasonic (UT) inspection operation or other such operation, on the beams of a top guide of a BWR.

Another aspect of the disclosed and claimed concept is to provide such an apparatus that can be received on the upper edges of the segments of the beams that are adjacent a receptacle in the top guide and that employs an alignment assembly to enable such reception of the apparatus on the upper edges of the beams.

Another aspect of the disclosed and claimed concept is to provide such an apparatus that occupies relatively little space in the region above the top guide of the BWR.

Another aspect of the disclosed and claimed concept is to provide such an inspection apparatus that can be easily deployed and operated to perform an inspection operation on the top guide of a BWR.

These aspects and others are provided by an improved apparatus structured to be received into a boiling water reactor (BWR) and to be usable to inspect at least a portion of a top guide of the BWR, the top guide having a plurality of beams arranged in a grid pattern, the top guide further having a number of receptacles, a receptacle of the number of receptacles being defined by and situated adjacent a subset of beams of the plurality of beams that can be generally stated as including a first pair of beams of the plurality of beams and a second pair of beams of the plurality of beams, each beam of the plurality of beams having an upper edge. The apparatus can be generally stated as including a housing that can be generally stated as including a base and a pair of supports, the pair of supports being situated on the base, each support of the pair of supports having an engagement edge, the engagement edges being structured to be received atop the upper edges of one of the first pair of beams and the second pair of beams, an alignment assembly situated on the base and which can be generally stated as including a plurality of legs and an actuator, the actuator being operable to simultaneously move the plurality of legs between a retracted position wherein at least one of the legs of the plurality of legs is structured to be disengaged from the subset of beams and an extended position wherein all of the legs of the plurality of legs are structured to be engaged with the subset of beams, and an inspection system situated on the base and that can be generally stated as including at least a first inspection device that is structured to be situated in proximity to the upper edge of a beam of the other of the first pair of beams and the second pair of beams when the legs are in the extended position and the engagement edges are received atop the upper edges of the one of the first pair of beams and the second pair of beams.

Other aspects of the disclosed and claimed concept are provided by an improved apparatus structured to be received into a boiling water reactor (BWR) and to be usable to inspect at least a portion of a top guide of the BWR, the top guide having a plurality of beams arranged in a grid pattern, the top guide further having a number of receptacles, a receptacle of the number of receptacles being defined by and situated adjacent a subset of beams of the plurality of beams that can be generally stated as including a first pair of beams of the plurality of beams and a second pair of beams of the plurality of beams, each beam of the plurality of beams having an upper edge. The apparatus can be generally stated as including a housing that can be generally stated as including a base and a pair of supports, the pair of supports being situated on the base, each support of the pair of supports having an engagement edge, the engagement edges being structured to be received atop the upper edges of one of the first pair of beams and the second pair of beams, an alignment assembly situated on the base and can be generally stated as including a plurality of legs that are structured to be engaged with the subset of beams, an inspection system situated on the base and that can be generally stated as including at least a first inspection device that is structured to be situated in proximity to the upper edge of a beam of the other of the first pair of beams and the second pair of beams when the engagement edges are received atop the upper edges of the one of the first pair of beams and the second pair of beams, and the inspection system further can be generally stated as including a drive apparatus that is situated on the base, the at least first inspection device being situated on the drive apparatus, the drive apparatus being operable to translate the at least first inspection device along an inspection path between a first location adjacent a first support of the pair of supports and a second location adjacent a second support of the pair of supports.

BRIEF DESCRIPTION OF THE DRAWINGS

A further understanding of the disclosed and claimed concept can be gained from the following Description when read in conjunction with the accompanying drawings in which:

FIG. 1 is a perspective view of an improved apparatus for use in inspecting a top guide of a BWR;

FIG. 2 is another perspective view of the apparatus of FIG. 1;

Similar numerals refer to similar parts throughout the specification.

DESCRIPTION

Figure 3:
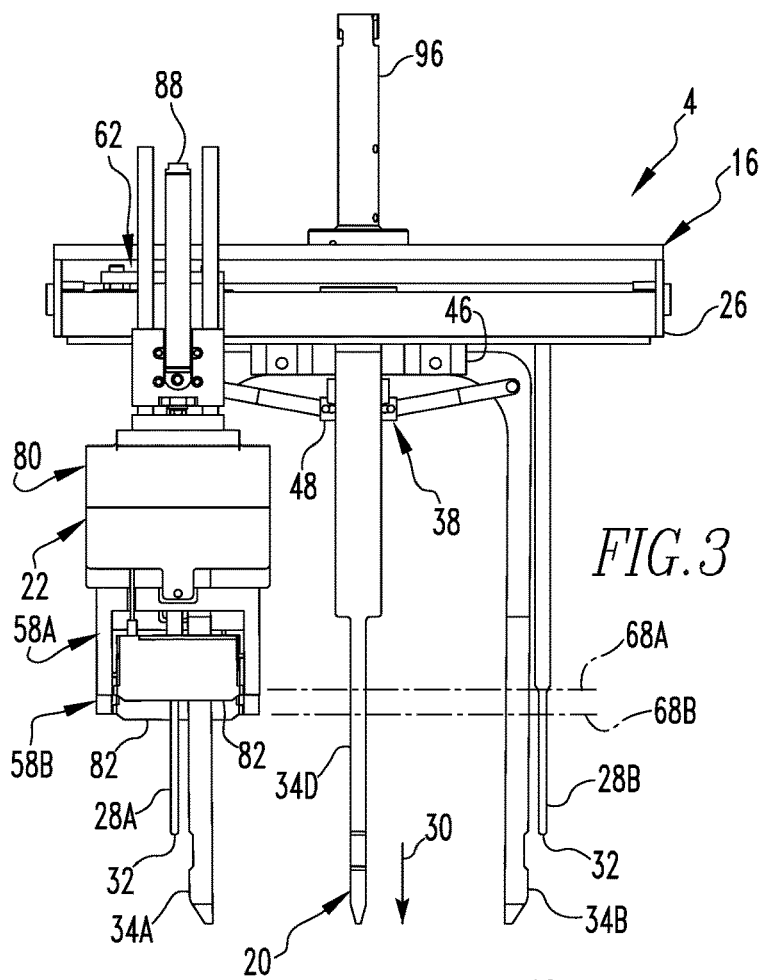
FIG. 3 is a front elevational view of the apparatus of FIG. 1 with an inspection system thereof in a first location.

An improved apparatus 4 in accordance with the disclosed and claimed concept is depicted in FIGS. 1-7 and is depicted in section in FIGS. 8-12. The apparatus 4 is an inspection apparatus that is usable in performing an inspection operation on a Boiling Water Reactor (BWR) 6 such as is depicted generally in FIG. 5. More particularly, the apparatus 4 is configured to perform an inspection operation such as an ultrasonic (UT) inspection operation on a top guide 8 (FIGS. 5 and 7) of the boiling water reactor 6. As can be understood from FIGS. 5 and 7, the top guide 8 includes a plurality of beams that are arranged in a grid pattern. The beams are indicated at the numerals 10A, 10B, 10C, 10D, 10E, and 10F, which may be collectively or individually referred to herein with the numeral 10. It is noted that the numeral 10 refers to other beams of the top guide 8 that are not otherwise specifically enumerated herein. The beams 10 each have an upper edge 12 upon which the apparatus 4 is receivable, as will be set forth in greater detail below.

The top guide 8 further includes a plurality of receptacles, two of which are indicated at the numerals 14A and 14B, and which may be collectively or individually referred to herein with the numeral 14. It is noted that other receptacles are likewise indicated at the numeral 14 if they are expressly enumerated otherwise herein. As can be understood from FIGS. 6 and 7, the receptacle 14A is situated adjacent the beams 10A, 10B, 10C, and 10D and, more specifically, is defined by and is situated adjacent segments of those four beams. The beams 10A and 10B are parallel one another and can be said to form a first pair of beams, and the beams 10C and 10D are likewise parallel with one another and can likewise be said to form a second pair of beams. The receptacle 14A is thus defined and is situated adjacent the segments of the first and second pairs of beams 10A, 10B, 10C, and 10D. In a similar fashion, the receptacle 14B is defined by and is situated adjacent segments of the beams 10B, 10E, 10D, and 10F. The segments of the beams 10B and 10E form another first pair of beams, and the segments of the beams 10D and 10F form another second pair of beams which together define and are situated adjacent the receptacle 14B. It can further be seen that the receptacles 14A and 14B can be said to be situated diagonally adjacent one another within the grid that is formed by the beams 10.

Figure 6:
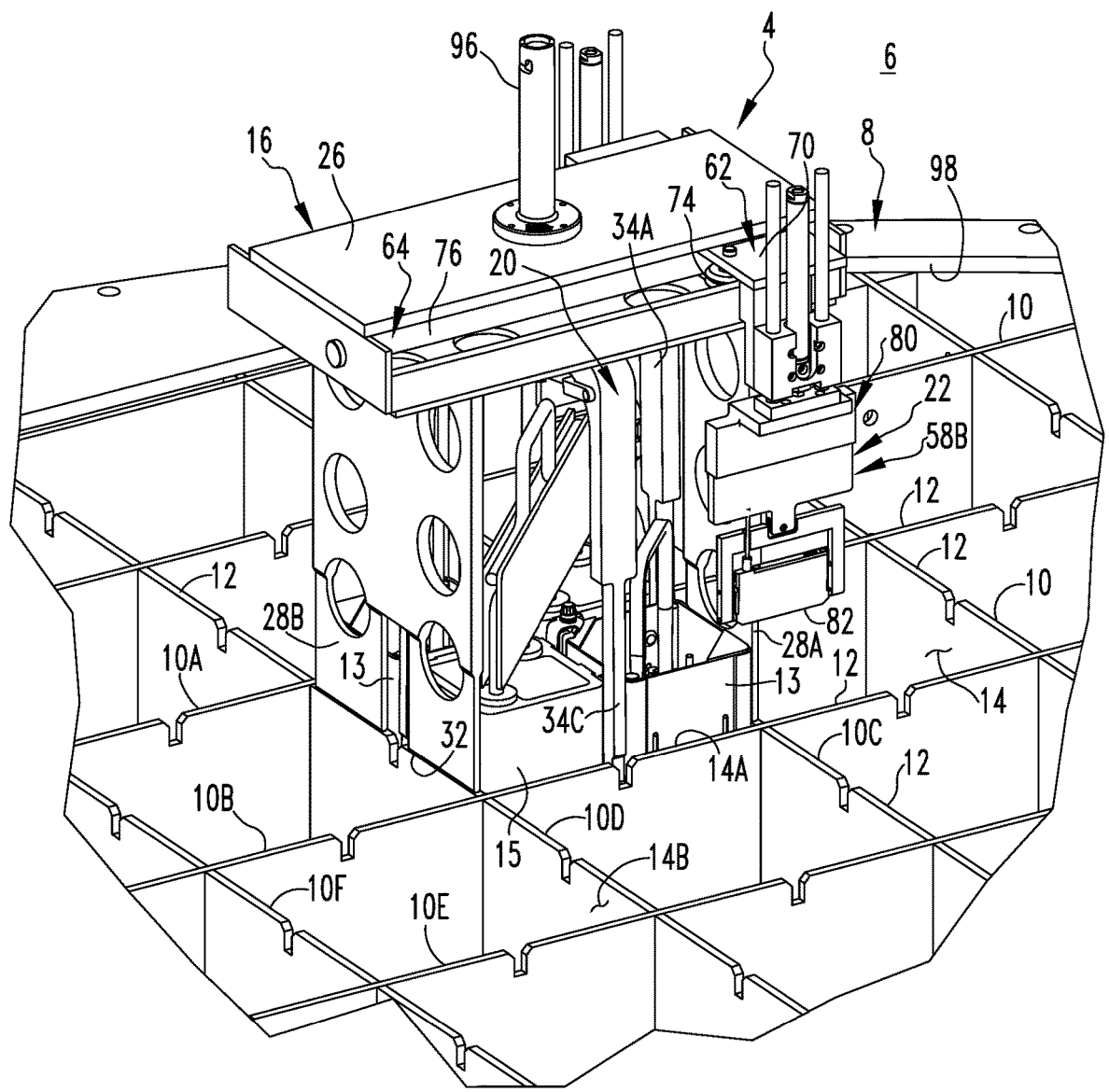
FIG. 6 is an enlargement of an indicated portion of FIG. 5.
Figure 7:
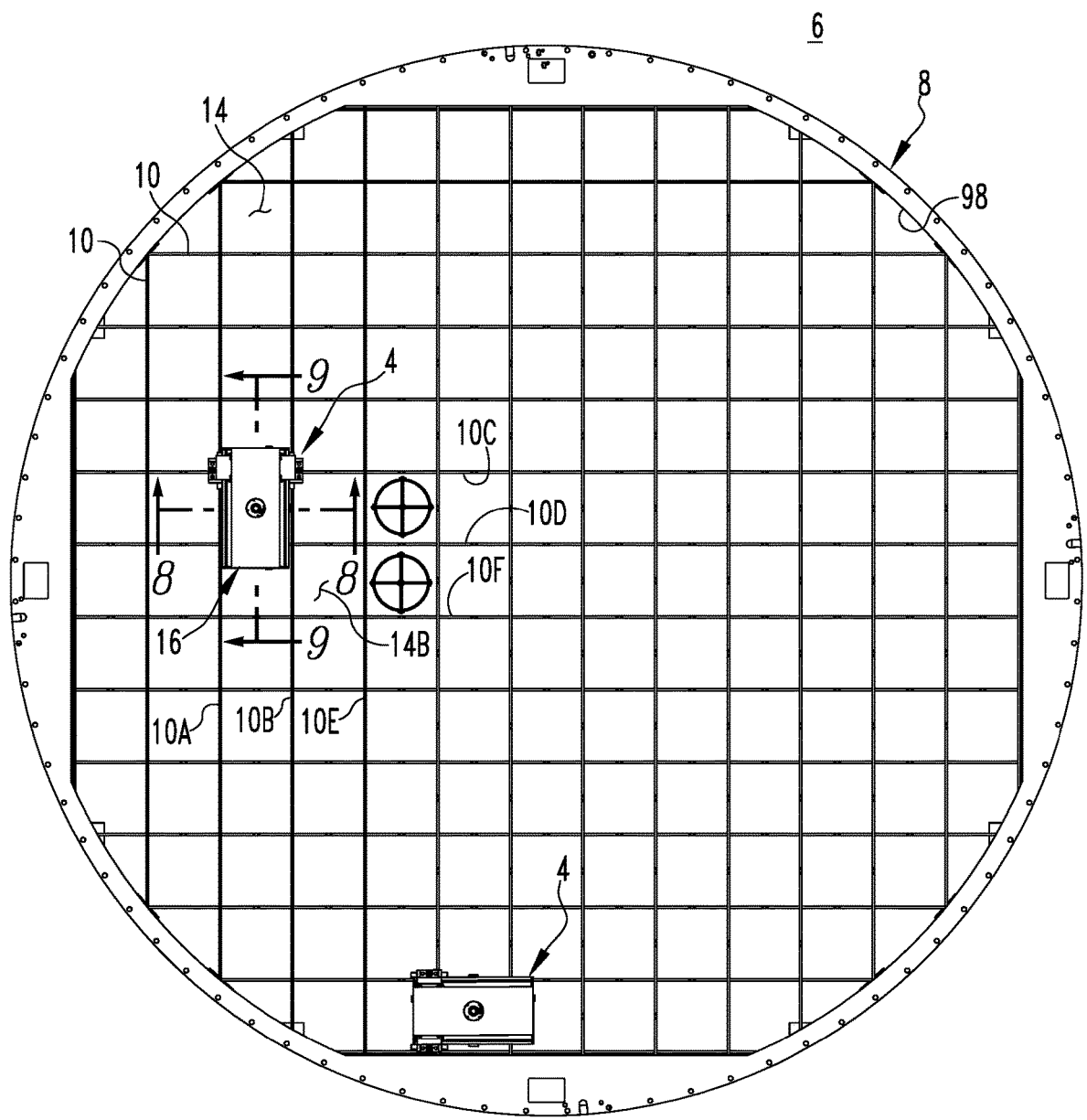
FIG. 7 is a top plan view of the top guide and the two instances of the apparatus as depicted in FIG. 5.

FIG. 6 depicts the receptacle 14A as having a pair of fuel bundles 13 situated therein and as further having a dummy pair 15 situated therein in place of a diagonally opposed pair of other fuel bundles that have already been removed. As noted elsewhere herein, the apparatus 4 is usable on any receptacle 14 whether or not some or all of the fuel bundles have been removed from the receptacle and regardless of whether any such fuel bundles may have been replaced with dummy fuel structures. This is highly advantageous since it does not require the removal of the fuel bundles and likewise does not require that the fuel bundles be removed and stored elsewhere in an appropriate location, thus saving time, effort, and money.

The apparatus 4 can be broadly construed as including a housing 16, an alignment assembly 20 situated on the housing 16, and an inspection system 22 that is likewise situated on the housing. The housing 16 itself can be said to include a base 26 and a pair of supports that are indicated at the numerals 28A and 28B, and which may be collectively or individually referred to herein with the numeral 28. The supports 28 are situated on the base 26 and extend away from the base 26 in a first direction 30. The supports 28 each include an engagement edge 32 at an end thereof opposite the base 26. As will be set forth in greater detail below, the engagement edges 32 are receivable on the upper edges 12 of a pair of beams 10 and, more specifically, are receivable atop the upper edges 12 of a pair of segments of an pair of parallel and adjacent beams 10 that are situated adjacent and that define one of the receptacles 14.

The alignment assembly 20 can be said to include four legs that are indicated at the numerals 34A, 34B, 34C, and 34D, and which may be collectively or individually referred to herein with the numeral 34. The legs are each of an approximately L-shaped configuration as can be seen in the accompanying drawings. The alignment assembly 30 further includes an actuator 38 (such as is depicted in FIGS. 8-12) that is situated on the base 26. More specifically, the actuator 38 can be said to include a stationary portion 40 that is affixed to the base 26 and a follower 44 that is movable with respect to the stationary portion 40 and which is connected with the legs 34, as will be set forth in greater detail below. The actuator 38 can be any of a wide variety of mechanical actuator devices and may be, for example, of a pneumatic configuration or a hydraulic or electric configuration or the like, without limitation.

The alignment assembly 20 further includes a hub 46 such as is depicted generally in FIG. 2 and which is affixed to an underside of the base 26. The legs 34 are each pivotably connected with the hub 46. More particularly, the legs 34 each include a first portion 50 that is pivotably connected with the hub 46 and which can be said to extend in a direction generally away from the hub 46. The legs 34 each further include a second portion 52 that is connected with the first portion 50 and which extends in the first direction 30 generally away from the corresponding first portion 50. As can be understood in the accompanying drawings, the first portions 50 of the legs 34A and 34B can be said to extend away from the hub 46 and toward the supports 28. The second portions 52 of the legs 34A and 34B can be said to extend along and adjacent the supports 28. The first portions 50 of the legs 34C and 34D extend away from the hub 46 but are situated approximately midway between the supports 28, and the second portions 52 of the legs 34C and 34D likewise extend in the first direction 30 away from the first portions 50 but are situated approximately midway between the supports 28.

The alignment system 20 further includes four links that are indicated at the numerals 56A, 56B, 56C, and 56D, and which extend between the legs 34A, 34B, 34C, and 34D, respectively, and a connector 48 that is affixed to the follower 44. The links 56A, 56B, 56C, and 56D may be collectively or individually referred to herein with the numeral 56. As a general matter, the links 56 are each pivotably connected at one end with the connector 48 and are pivotably connected at the opposite end with the corresponding leg 34. In the depicted exemplary embodiment, the links 56 each have a yoke-type connection with the corresponding leg 34.

The inspection system 22 can be said to include a pair of inspection devices that are indicated at the numerals 58A and 58B, and which may be collectively or individually referred to herein with the numeral 58. The inspection system 22 further includes a tractor 62 is movably situated on the base 26 and upon which the inspection devices 58 are disposed. The inspection system 22 additionally includes a drive apparatus 64 that is disposed on the base 26 and which is connected with the tractor 62. The drive apparatus 64 is operable to move the tractor 62 between a first position at one end of the base 26 adjacent the support 28A, as is depicted generally in FIGS. 1-3, and a second position adjacent an opposite end of the base 26 adjacent the support 28B, as is depicted generally in FIG. 4. Such movement of the inspection system 22 between the first and second positions at the opposite ends of the base 26 causes the inspection device 58A to move along an inspection path 68A and to cause the inspection device 58B to move along an inspection path 68B. It is noted that FIG. 3 depicts the inspection device 58B slightly lower than the inspection device 58A, i.e., in slightly different vertical positions, in order to illustrate that the inspection device 58B is situated behind the inspection device 58A in FIG. 3, but in FIG. 4 the inspection devices 58 are depicted as being in the same vertical position.

As can be seen in the accompanying drawings, the tractor 62 can be said to include a plate 70 and a number of wheels 74 that are mounted to the plate 70 and that are rollably engaged with inboard surfaces of the base 26. As employed herein, the expression "a number of" and variations thereof shall refer broadly to any non-zero quantity, including a quantity of one. The drive apparatus 64 can be said to include an elongated cylinder 76 that is mounted to the base 26 and which is operably connected with the plate 70. In the depicted exemplary embodiment, the cylinder 76 is a pneumatic cylinder having a magnetic element situated therein and which is caused to translate along the interior of the cylinder 76 due to varying pneumatic pressures in different regions of the cylinder 76. The magnet that is situated within the cylinder 76 is magnetically connected with a ferromagnetic structure that is situated on the plate 70. It is noted, however, that the cylinder 76 can be of any of a wide variety of configurations other than pneumatic, such as hydraulic or motor-operated, by way of example and without limitation.

The inspection devices 58 can each be said to include a holder 80 and an inspection element 82. The holder 80 is situated on the plate 70 of the tractor 62. The inspection element 82 is situated on the holder 80 at a location at the end of the holder 80 opposite the plate 70 such that the inspection element 82 is spaced in the first direction 30 away from the base 26. More specifically, the holder 80 can be said to include a platform 86 that is affixed to the plate 70 and to further include an extension mechanism 88 that is situated on the platform 86. The holder 80 can further be said to include a mount that is situated on the extension mechanism 88 and which holds the inspection element 82. The extension mechanism 88 is operable to move the mount 92 and the inspection element 82 that is situated thereon between, for instance, a first position, such as is depicted generally in FIGS. 8-11 and a second position such as is depicted generally in FIG. 12, with the second position being relatively farther away from the base 26 and relatively closer to the upper edge 12 of one of the beams 10 than the first position. As a general matter, it is understood that the inspection elements 82, which may be ultrasonic (UT) inspection elements or other inspection elements, are sensitive devices. By providing the extension mechanism 88, the inspection elements 82 can be in a retracted position relatively closer to the base 26 in order to avoid collisions between the inspection elements 82 and, for instance, the fuel bundles 13 or the beams 10, by way of example, when the apparatus is being received atop a pair of the beams 10. Moreover, the inspection elements 82 need not be situated in the second position of FIG. 12 in order to perform an inspection operation on the beams 10. Rather, an inspection can be performed even if the inspection elements 82 are in the position depicted generally in FIGS. 8-11 as long as the inspection elements 82 are maintained at a predetermined proximity, i.e., at a fixed distance, with respect to the beam 10 that is being inspected by the inspection element 82 as the inspection element is moved through its inspection path.

Figure 8:
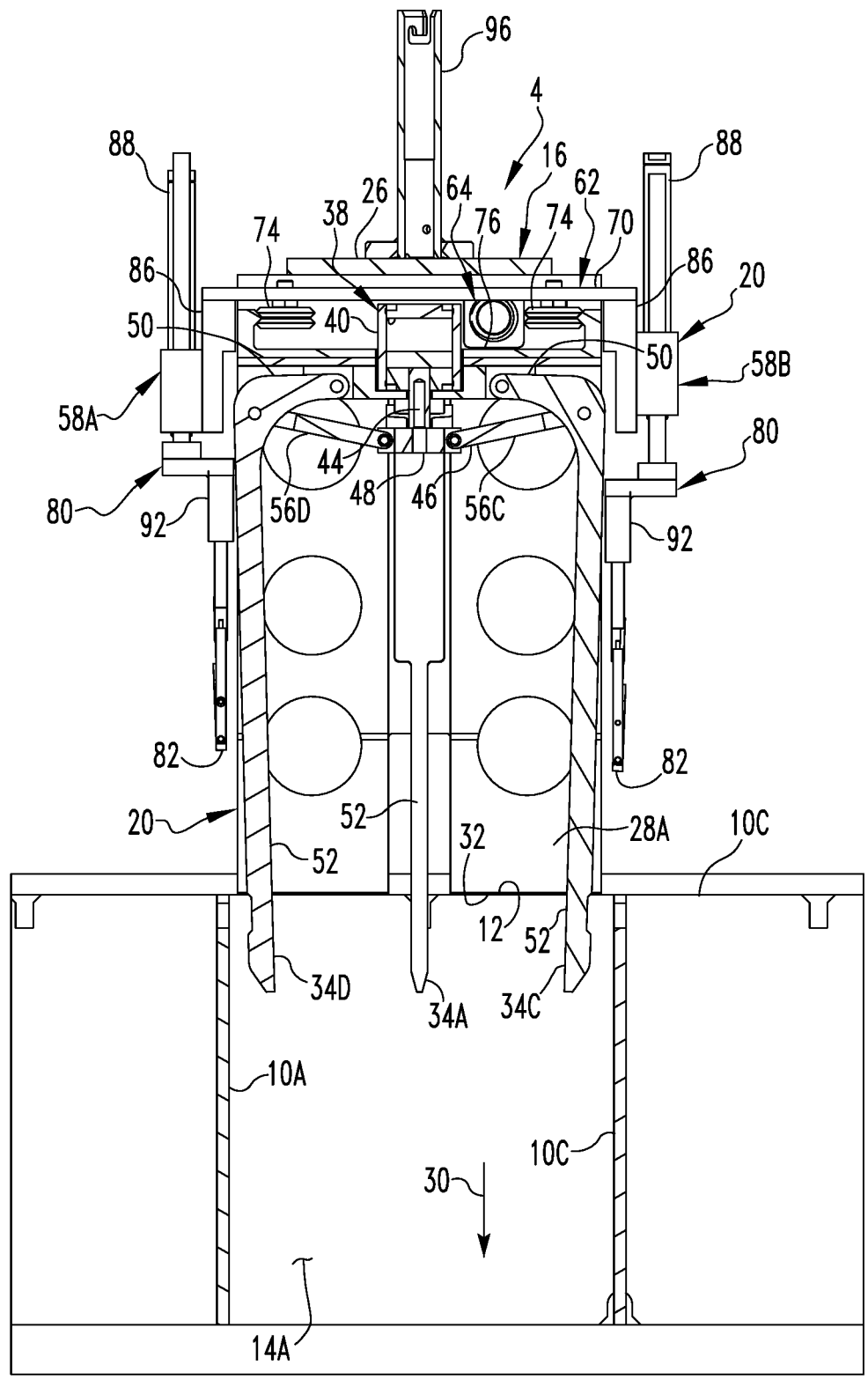
FIG. 8 is a sectional view as taken along line 8-8 of FIG. 7 and depicting an alignment assembly of the apparatus of FIG. 1 in a retracted position.
Figure 9:
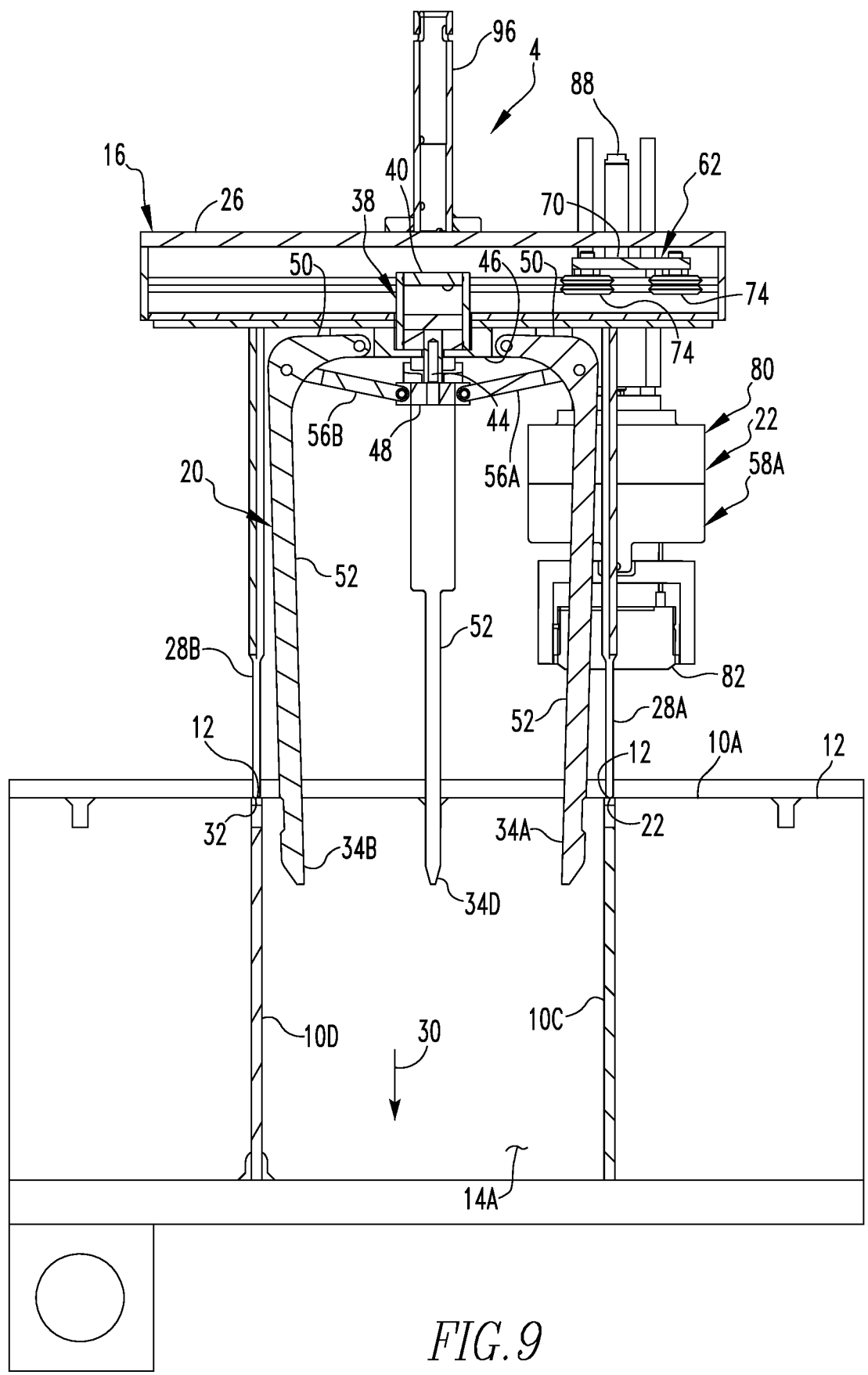
FIG. 9 is a sectional view as taken along line 9-9 of FIG. 7 and depicting the alignment assembly in the retracted position.
Figure 10:
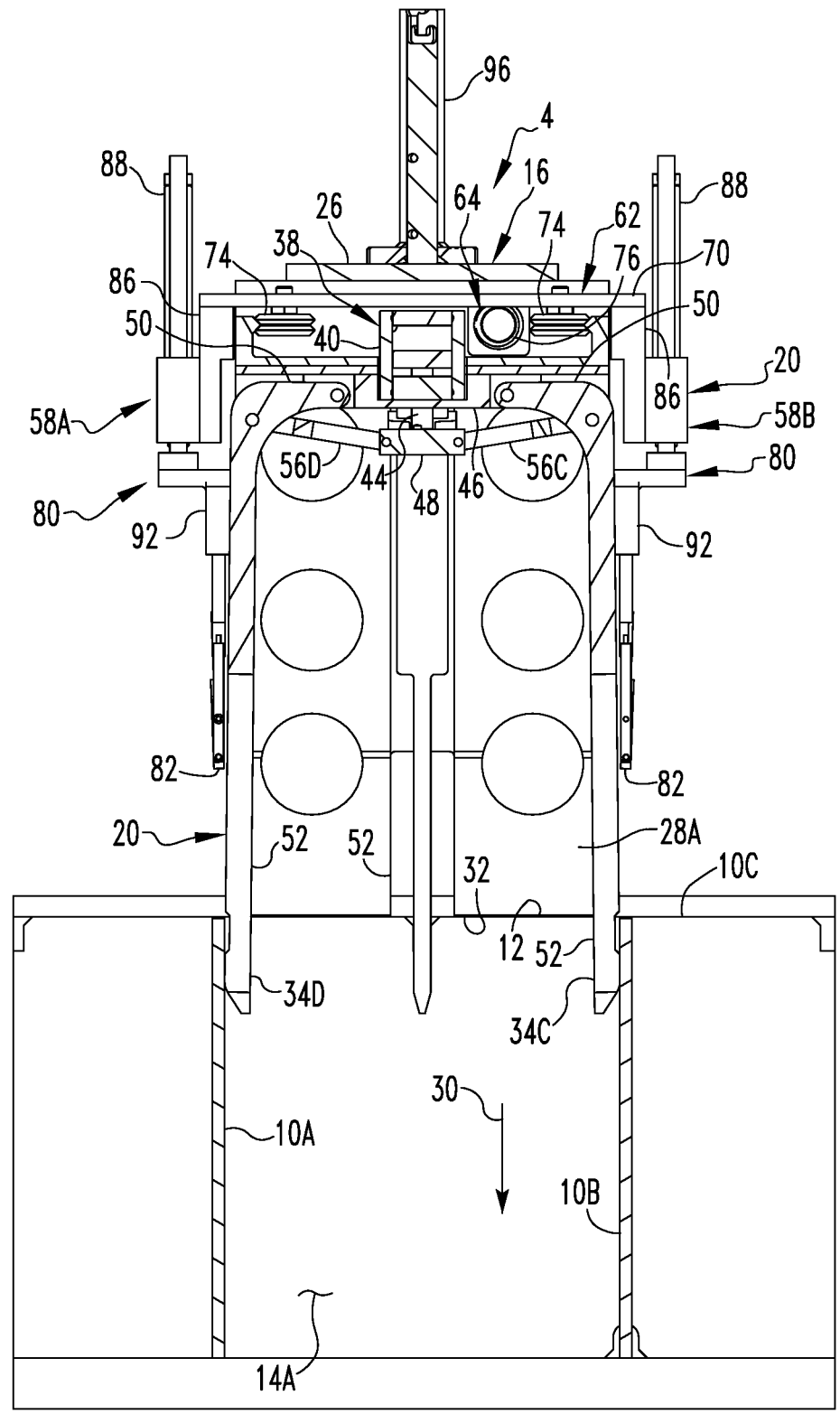
FIG. 10 is a view similar to FIG. 8, except depicting the alignment assembly in an extended position.
Figure 11:
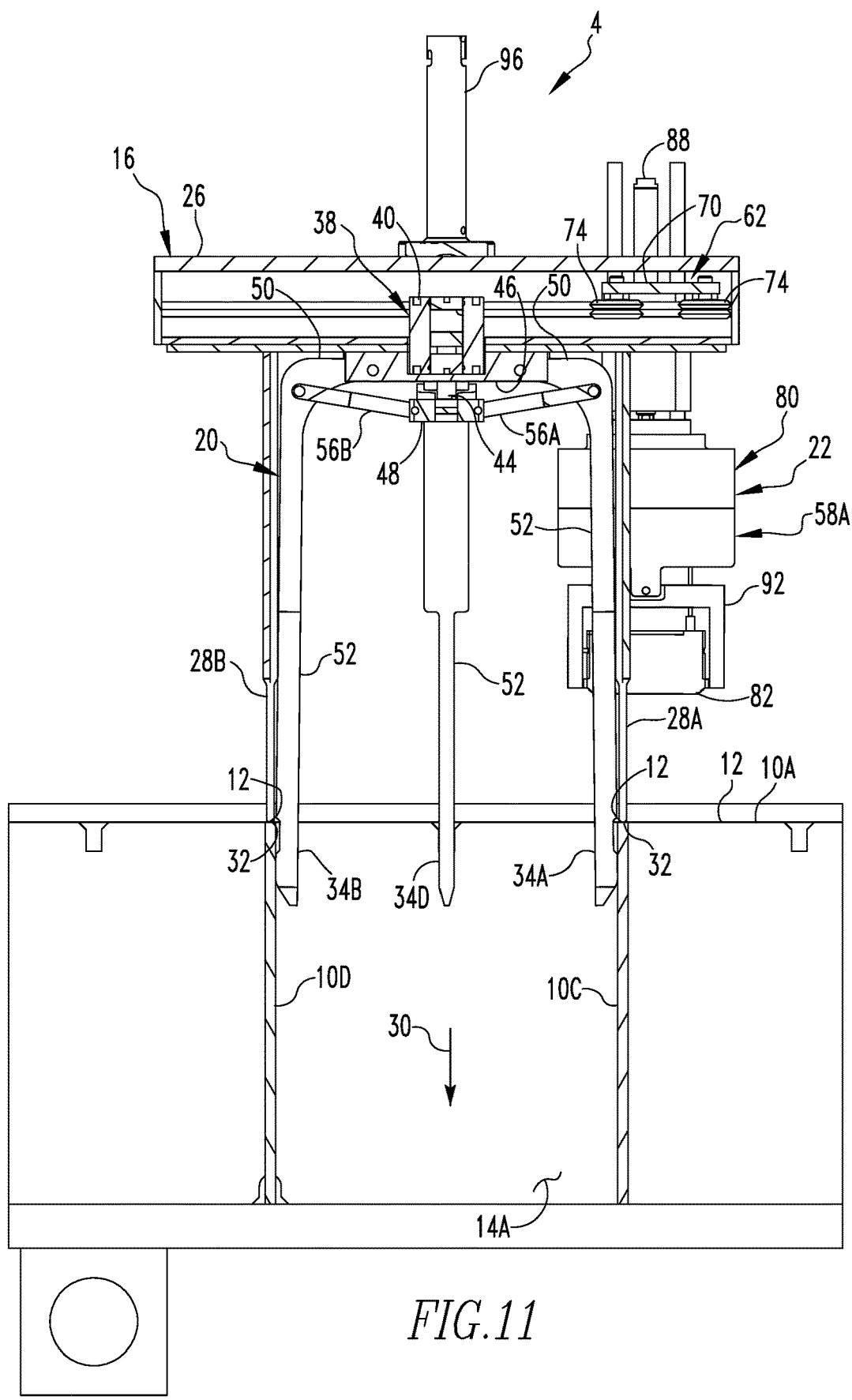
FIG. 11 is a view similar to FIG. 9, except depicting the alignment assembly in the extended position and with the inspection system in a first position situated above a beam of the top guide.
Figure 12:
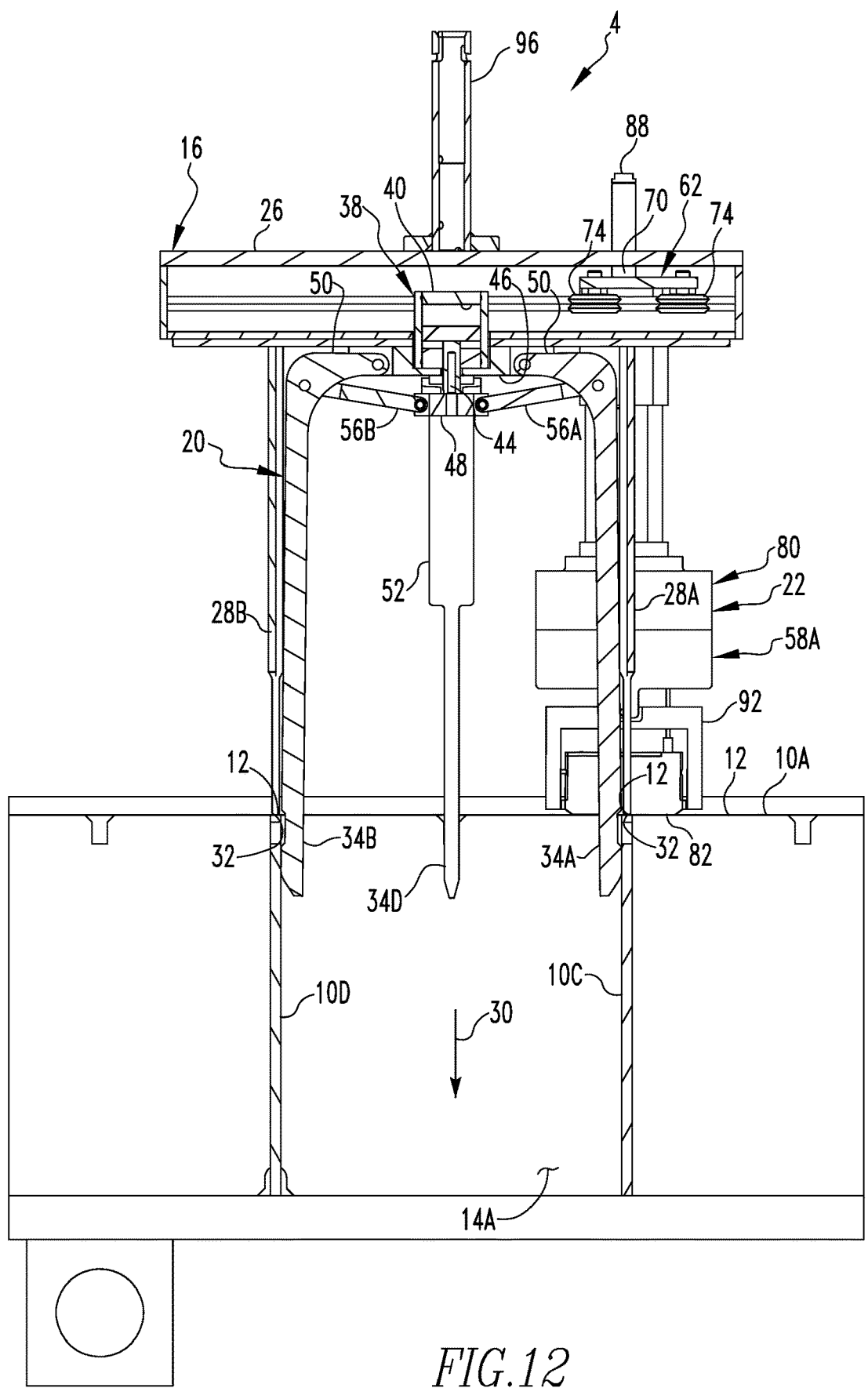
FIG. 12 is a view similar to FIG. 11, except depicting the inspection system in a second position that is relatively closer to the beam of the top guide than the first position.

As can be understood from FIGS. 8-12, the alignment assembly 20 is movable between a retracted position, such as is depicted generally in FIGS. 8-9, and an extended position, such as is depicted generally in FIGS. 10-12. In the retracted position, the follower 44 and the connector 48 that is situated thereon are spaced relatively farther away from the stationary portion 44 than in the retracted position of FIGS. 10-12. Movement of the follower 44 and the connector 48 in the first direction 30, i.e., in the downward direction from the perspective of FIG. 8-12, from the extended position to the retracted position causes the links 56 to simultaneously pull the legs 34 in a generally inward direction such that the second portions 52 move generally toward one another and such that one or more of the legs 34 is disengaged from the segments of the beams 10 that are situated adjacent the receptacle 14A. However, when the follower 44 and the connector 48 are caused to move relatively closer to the stationary portion 44, i.e., in the upward direction from the perspective of FIG. 8-12, the legs 34 are simultaneously pivoted in a generally outward direction such that the second portions 52 move generally away from one another to cause the legs 34 to engage the segments of the beams 10 that are situated adjacent the receptacle 14A. For instance, and as can be understood from FIGS. 8 and 9, in the retracted position the leg 34A is spaced away from the beam 10C, the leg 34B is spaced away from the beam 10D, the leg 34C is spaced away from the beam 10B, and the leg 34D is spaced away from the beam 10A. When the actuator 38 is actuated to cause the follower 44 and the connector 48 attached thereto to move in the upward direction from the perspective of FIGS. 8-12 to be relatively closer to the stationary portion 40, however, the legs 34 are simultaneously pushed in a generally outward direction to cause the leg 34A to engage the beam 10C, to cause the leg 34B to engage the beam 10D, to cause the leg 34C to engage the beam 10B, and to cause the leg 34D to engage the beam 10A.

Such simultaneous movement of the legs 34 between the retracted position of FIGS. 8 and 9 and the extended position of FIGS. 10-12 causes the housing 16 to self-align with the beams 10 of the receptacle 14, by way of example. For instance, if the apparatus 4 is relatively closer to the beam 10A than it is to the beam 10B, the simultaneous motion of the legs 34 toward the extended position will cause the leg 34D to engage the segment of the beam 10A within the receptacle 14A prior to the time at which the leg 34C engages the segment of the beam 10B within the receptacle 14A. Such engagement of the leg 34D with the beam 10A and such movement of the leg 34D toward the extended position while the leg 34C remains disengaged from the beam 10B will cause the apparatus 4 to be moved generally toward the beam 10B, i.e., generally in the rightward direction with respect to the top guide 8 from the perspective of FIG. 8, until the leg 34C engages the beam 10B. Such a movement of the apparatus 4 is an alignment movement which causes the apparatus 4 to be centered above the beams 10A and 10B. A similar alignment movement occurs simultaneously therewith if the apparatus 4 is relatively closer to one of the beams 10C and 10D than the other, which would be along the left-right direction in FIG. 9. The two simultaneous alignment movements cause the apparatus 4 to be centered with respect to the segments of the beams 10A, 10B, 10C, and 10D above the receptacle 14A, which also causes the supports 28A and 28B to become aligned with the segments of the beams 10C and 10D in the example presented herein.

It is understood that FIGS. 8 and 9 depict the housing 16 as already being aligned with the beams 10A, 10B, 10C, and 10D in order to better illustrate the movement of the legs between the retracted and extended positions. It is understood, however, that in actual operation the apparatus 4 typically will be positioned such that the engagement edges 32 of the supports 28 are spaced a certain distance above the upper edges 12 of the beams 10 while the second portions 52 of the legs are received in the receptacle 14. The alignment assembly 20 will then be energized to cause the legs 34 to simultaneously move from the retracted position toward the extended position, which will cause the housing 16 to become aligned with the beams 10A, 10B, 10C, and 10D, at which point the apparatus 4 can be further moved in the downward direction from the perspective of FIGS. 8 and 9 to cause the engagement edges 32 to be received atop the upper edges 12 of the beams 10 that define and that are situated adjacent the receptacle 14B. In this regard, it can be seen in FIG. 6 that the legs 34 are movable within the narrow spaces between the fuel bundles 13 and/or the dummy pair 15, and it can be seen that the free ends of the second portions 52 are narrowed, i.e., compared with the first portions 50, in order to enable such movement between the fuel bundles 13. It can also be seen that the free ends of the supports 28 are narrowed, i.e., compared with the portions of the supports 28 that are directly connected with the base 26, to facilitate the ends of the supports 28 being received between fuel bundles 13 and/or dummy pairs 15 of adjacent receptacles 14.

With the alignment assembly 20 in the extended position to enable the engagement edges 32 of the supports 28 to be received on the upper edges 12 of the beams 10C and 10D, the inspection system 22 is ready to inspect the segments of the beams 10A and 10B that are situated adjacent the receptacle 14A. Depending upon the needs of the given application, the inspection elements 82 can be retained in the position spaced a fixed distance above the upper edges 12 of the beams 10A and 10B, as is depicted in FIGS. 10 and 11. The drive apparatus 64 can then be energized to cause the tractor 62 to move the inspection devices 58 between the first location, such as is depicted generally in FIGS. 8-12, and the second location, such as is depicted generally in FIG. 4. Again, such movement between the first and second locations causes the inspection elements 82 to move through a pair of inspection paths 68A and 68B to cause the inspection elements 82 to perform an inspection operation on the segments of the beams 10 that are situated underneath the inspection elements 82.

Figure 4:
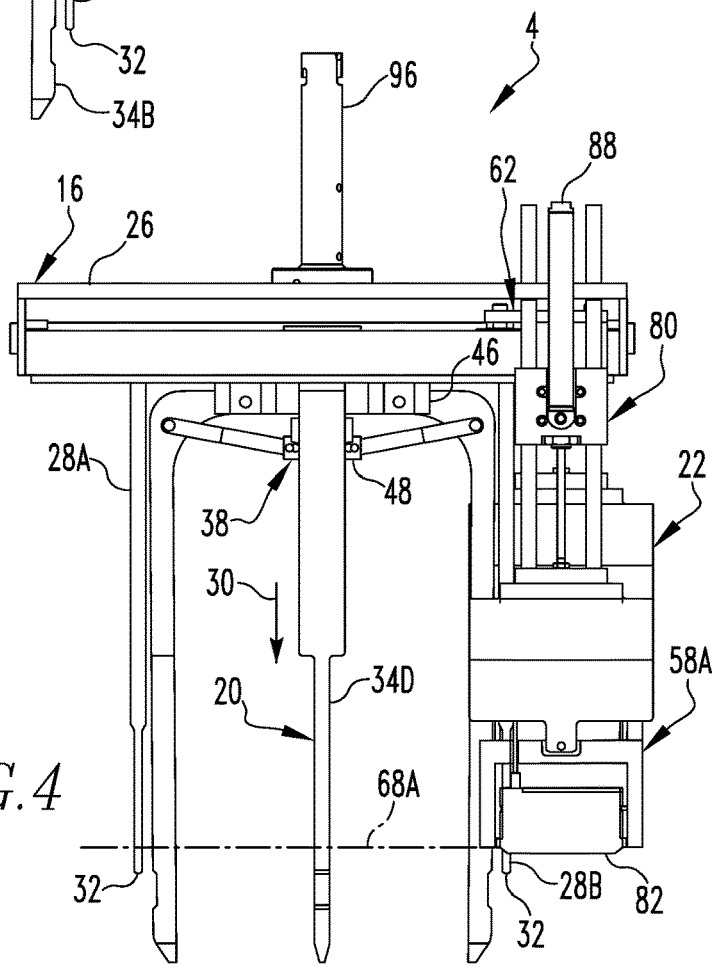
FIG. 4 is a view similar to FIG. 3, except depicting the inspection system in a second location.
Figure 5:
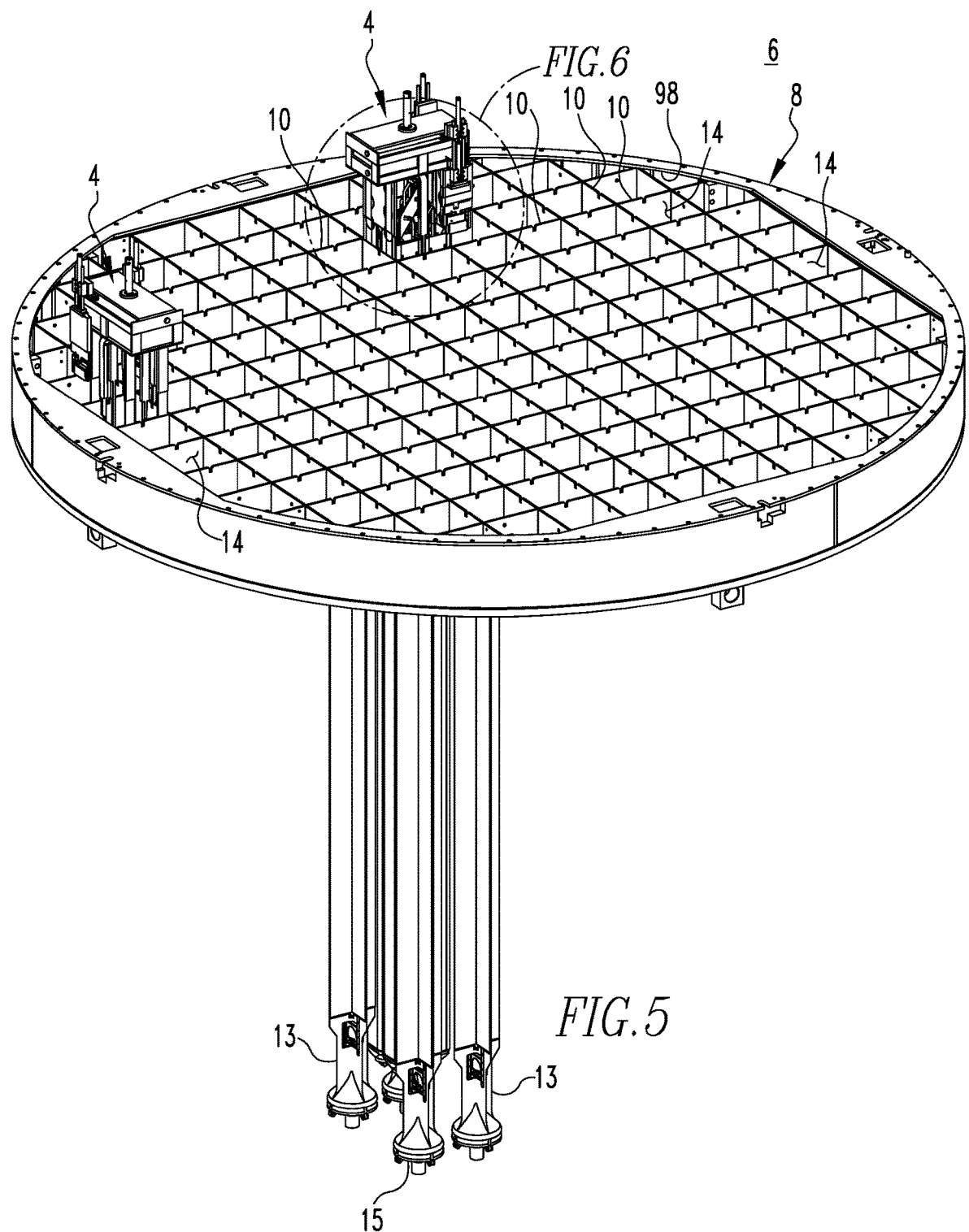
FIG. 5 is perspective view of a top guide of a BWR having two of the apparatuses of FIG. 1 situated thereon.

Once the inspection operation of the first pair of segments of the beams 10, which are the segments of the beams 10A and 10B in the example presented herein, the alignment assembly 20 can be moved from the extended position back to the retracted position, and the apparatus 4 can be lifted in the vertically upward direction, if necessary, and can be physically rotated above the top guide 8 through ninety degrees, after which the alignment assembly 20 can be energized to cause the legs 34 to simultaneously return to the extended position to thereby again align the apparatus 4 with the other pair of beams 10 of the receptacle 14. In such a situation, the engagement edges 32 would become aligned with and engaged with the upper edges 12 of the segments of the beams 10A and 10B that had just been inspected by the inspection system 22, and the inspection system 22 would be positioned to perform an inspection on the segments of the beams 10C and 10D, i.e., the beams on which the supports 28 had previously been situated. To perform the inspection, the drive apparatus could be energized to cause the inspection elements 82 to move from the second location that is depicted in FIG. 4 back to the first location that is depicted in FIGS. 1-3. Alternatively, the inspection elements 82 might need to be returned to the first position of FIGS. 1-3 before another inspection operation can be performed. Again, the inspection operation will be performed with the inspection elements 82 situated at the fixed distance from the upper edges 12 of the beams 10, such as is depicted generally in FIGS. 8-11, or the extension mechanism 88 can be operated to cause the inspection elements 82 to move to the second position relatively closer to the beams 10 or, if needed, physically in contact with the upper edges 12 of the beams 10, to perform the inspection as needed depending upon the requirements of the given application.

After the inspection of the segments of the beams 10A, 10B, 10C, and 10D adjacent the receptacle 14A is complete, the apparatus 4 can be removed from the receptacle 14A and can be moved to an adjacent receptacle, such as the receptacle 14B. As noted elsewhere herein, the receptacles 14A and 14B are diagonally situated with respect to one another. In this regard, it can be understood that the four segments of the beams 10A, 10B, 10C, and 10D, which were inspected by the inspection system 22 in the exemplary set of operations noted above, are shared by four other receptacles 14 that are adjacent the receptacle 14A. For example, the segment of the beam 10A that was inspected in the aforementioned procedure is shared with the receptacle 14 that is immediately to the left in FIG. 7 of the receptacle 14A. Likewise, the segment of the beam 10C that was inspected in the aforementioned procedure is shared with the receptacle 14 that is situated directly above the receptacle 14A in FIG. 7. It thus can be understood that progressive inspections of receptacles can advantageously occur in a diagonal direction from the perspective of FIG. 7, and it can further be understood that only about one half of the receptacles need to have the apparatus 4 received therein since the segments of the beams 10 are shared by adjacent receptacles 14.

It thus can be understood that the apparatus 4 can easily be used to inspect the beams 10 of the top guide 8. The apparatus 4 is relatively small and is provided with a lug 96 that is situated generally centrally on the base 26 and which can be caused to cooperate with poles and the like that can be manually held from locations vertically above the environment of the BWR 6. The apparatus 4 is lightweight and occupies only a relatively small region of the top guide 8, and it therefore does not impede other activities that can be caused to occur on other portions of the BWR at other locations on the top guide 8. It also can be understood that multiple instances of the apparatus 4 can be deployed to inspect different portions of the top guide 8. This is suggested from FIGS. 5 and 7. Furthermore, it can be seen that the inspection system 22 is movable along a sufficient distance that the edges of the beams 10 all the way to the circular frame 98 of the top guide 8 can be inspected, which is desirable. Other benefits will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An apparatus structured to be received into a boiling water reactor (BWR) and to be usable to inspect at least a portion of a top guide of the BWR, the top guide having a plurality of beams arranged in a grid pattern, the top guide further having a number of receptacles, a receptacle of the number of receptacles being defined by and situated adjacent a subset of beams of the plurality of beams that comprises a first pair of beams of the plurality of beams and a second pair of beams of the plurality of beams, each beam of the plurality of beams having an upper edge, the apparatus comprising:

a housing comprising a base and a pair of supports, the pair of supports being situated on the base, each support of the pair of supports having an engagement edge, the engagement edges being structured to be received atop the upper edges of one of the first pair of beams and the second pair of beams;

an alignment assembly situated on the base and comprising a plurality of legs and an actuator, the actuator being operable to simultaneously move the plurality of legs between a retracted position wherein at least one of the legs of the plurality of legs is structured to be disengaged from the subset of beams and an extended position wherein all of the legs of the plurality of legs are structured to be engaged with the subset of beams; and an inspection system situated on the base and comprising at least a first inspection device that is structured to be situated in proximity to the upper edge of a beam of the other of the first pair of beams and the second pair of beams when the legs are in the extended position and the engagement edges are received atop the upper edges of the one of the first pair of beams and the second pair of beams.

2. The apparatus of claim 1 wherein the plurality of legs are each movably situated on the base, wherein the actuator is situated on the base, and wherein the alignment assembly comprises a plurality of links that extend between the actuator and the plurality of legs.

3. The apparatus of claim 1 wherein the inspection system further comprises a drive apparatus that is situated on the base, the at least first inspection device being situated on the drive apparatus, the drive apparatus being operable to translate the at least first inspection device along an inspection path between a first location adjacent a first support of the pair of supports and a second location adjacent a second support of the pair of supports.

4. The apparatus of claim 3 wherein the inspection system further comprises a second inspection device, the drive apparatus being operable to translate the second inspection device along another inspection path between another first location adjacent the first support and another second location adjacent the second support.

5. The apparatus of claim 3 wherein the at least first inspection device comprises a holder and an inspection element, the holder being situated on the drive apparatus, the inspection element being situated on the holder.

6. The apparatus of claim 5 wherein the pair of supports each extend away from the base in a first direction, and wherein the inspection element situated on the holder is spaced away from the base in the first direction.

7. The apparatus of claim 6 wherein each leg of the plurality of legs is of an L-shaped configuration having a first portion situated adjacent the base and having a second portion that extends in the first direction away from the first portion.

8. The apparatus of claim 7 wherein the first portions of a pair of legs of the plurality of legs extend in a direction generally away from the actuator and toward the pair of supports, and wherein the second portions of the pair of legs extend adjacent the pair of supports.

9. The apparatus of claim 8 wherein the first portions of another pair of legs of the plurality of legs extend in a direction generally away from the actuator and generally midway between the pair of supports, and wherein the second portions of the pair of legs extend generally midway between the pair of supports.

10. The apparatus of claim 6 wherein the holder comprises an extension mechanism that is structured to translate the inspection element between a first position disposed a first distance away from the base and a second position disposed a second distance away from the base greater than the first distance.

11. An apparatus structured to be received into a boiling water reactor (BWR) and to be usable to inspect at least a portion of a top guide of the BWR, the top guide having a plurality of beams arranged in a grid pattern, the top guide further having a number of receptacles, a receptacle of the number of receptacles being defined by and situated adjacent a subset of beams of the plurality of beams that comprises a first pair of beams of the plurality of beams and a second pair of beams of the plurality of beams, each beam of the plurality of beams having an upper edge, the apparatus comprising:

a housing comprising a base and a pair of supports, the pair of supports being situated on the base, each support of the pair of supports having an engagement edge, the engagement edges being structured to be received atop the upper edges of one of the first pair of beams and the second pair of beams;

an alignment assembly situated on the base, wherein the alignment assembly comprises a plurality of legs that are structured to be engaged with the subset of beams and an actuator operable to move at least one of the plurality of legs in relation to the base and the subset of beams;

an inspection system situated on the base and comprising at least a first inspection device that is structured to be situated in proximity to the upper edge of a beam of the other of the first pair of beams and the second pair of beams when the engagement edges are received atop the upper edges of the one of the first pair of beams and the second pair of beams; and the inspection system further comprising a drive apparatus that is situated on the base, the at least first inspection device being situated on the drive apparatus, the drive apparatus being operable to translate the at least first inspection device along an inspection path between a first location adjacent a first support of the pair of supports and a second location adjacent a second support of the pair of supports.

* * * * *